US007038351B2

(12) United States Patent
Kobayashi et al.

(10) Patent No.: US 7,038,351 B2
(45) Date of Patent: May 2, 2006

(54) METAL-GRAPHITE BRUSH AND MOTOR INCLUDING A METAL-GRAPHITE BRUSH

(75) Inventors: Hiroshi Kobayashi, Kariya (JP); Michihiko Soutome, Yokosuka (JP)

(73) Assignees: Aisin Seiki Kabushiki Kaisha, Kariya (JP); Toho Chemical Industry Co., Ltd., Tokyo (JP)

( * ) Notice: Subject to any disclaimer, the term of this patent is extended or adjusted under 35 U.S.C. 154(b) by 0 days.

(21) Appl. No.: 11/107,805

(22) Filed: Apr. 18, 2005

(65) Prior Publication Data

US 2005/0236925 A1 Oct. 27, 2005

(30) Foreign Application Priority Data

Apr. 27, 2004 (JP) ............................. 2004-131657

(51) Int. Cl.
*H02K 13/00* (2006.01)
*H01R 39/20* (2006.01)
*H01R 39/56* (2006.01)

(52) U.S. Cl. ...................................... 310/252; 310/228

(58) Field of Classification Search ................. 310/252
See application file for complete search history.

(56) References Cited

U.S. PATENT DOCUMENTS

| | | | | | |
|---|---|---|---|---|---|
| 444,794 | A * | 1/1891 | Cook | 428/408 |
| 2,425,046 | A * | 8/1947 | Ramadanoff | 428/408 |
| 2,819,989 | A | 1/1958 | Kiefer | |
| 2002/0039528 | A1 * | 4/2002 | Kato et al. | 415/182.1 |
| 2003/0155836 | A1 * | 8/2003 | Uda et al. | 310/239 |
| 2005/0236925 | A1 | 10/2005 | Kobayashi et al. | |
| 2006/0043819 | | 3/2006 | Kobayashi | |

FOREIGN PATENT DOCUMENTS

| | | |
|---|---|---|
| FR | 2 297 504 | 8/1976 |
| GB | 800551 | 8/1958 |
| JP | 2001-298913 | 10/2001 |

* cited by examiner

*Primary Examiner*—Darren Schuberg
*Assistant Examiner*—Erik Preston
(74) *Attorney, Agent, or Firm*—Oblon, Spivak, McClelland, Maier & Neustadt, P.C.

(57) ABSTRACT

A metal-graphite brush for supplying electricity to a coil wound around a core provided at a rotor of a motor is made of sintered material having porosities at a surface of, or inside, the sintered material. The metal-graphite brush is infiltrated by a liquid containing a plurality of kinds of glycol ether having varying numbers of alkylene oxide structure units. The liquid has a boiling point higher than that of water.

21 Claims, 9 Drawing Sheets

METAL-GRAPHITE BRUSH AND MOTOR INCLUDING A METAL-GRAPHITE BRUSH

CROSS REFERENCE TO RELATED APPLICATIONS

This application is based on and claims priority under 35 U.S.C. § 119 to Japanese Patent Application 2004-131657, filed on Apr. 27, 2004, the entire content of which is incorporated herein by reference.

FIELD OF THE INVENTION

This invention generally relates to a metal-graphite brush for supplying electricity to a rotor of a motor, and a motor including a metal-graphite brush. More particularly, this invention pertains to a metal-graphite brush, which does not wear out even when used in high-temperature conditions equal to or higher than 100° C., an invention by virtue of which the longevity of the metal-graphite brush, and of a motor including the metal-graphite brush, can also be enhanced.

BACKGROUND

For a motor having a brush, electricity is supplied through the brush slidably contacting with a commutator. A coil wound around a core of a rotor is connected to the commutator. When electricity is supplied to the coil, the rotor starts to rotate by virtue of the forces of attraction and repulsion applied from a permanent magnet provided in a housing so as to face the rotor.

In the motor having the configuration described above, when the motor is operated, the brush slides relative to the commutator, which is in contact with the brush. In such a situation, the slidable contacting surfaces of the brush and the commutator tend to wear out, a phenomenon that is liable to create problems. Conventionally, for purposes of restricting the degree of wear of a brush, materials used for making a brush have been varied, or the hardness of a brush has been controlled so as to restrict discharge of sparks occurring at the slidable contacting surfaces at a time of electrical or mechanical wear or when the motor is driven.

On the other hand, in the cases of a motor having a brush, intended for use in a vehicle, a metal-graphite brush, made by a process of sintering graphite particles and copper particles mixed in a binder, has been conventionally known (JP2001-298913A).

A conventional method for manufacturing a metal-graphite brush is as follows. First, natural graphite particles, as a base material, and a phenol resin solution, as a binder, are mixed. Next, a lubricant, such as molybdenum disulfide, is added to the mixture. Then, the mixture is sintered in a nitrogen-rich atmosphere at a temperature within a range of from 700 to 800° C. In this case, the film of dissolved phenol resin formed on the surface of the graphite particles is carbonized by a process of sintering, and thus becomes amorphous graphite. This amorphous graphite, as a binder, binds graphite particles. In addition, because a part of the organic substances, originally included in the solution of phenol resin, sublimate as a carbon dioxide, or as water vapor, many porosities are formed on both the surface and the interior of the metal-graphite brush. Thanks to the hygroscopic property of the graphite particles of which the metal-graphite brush is formed, the metal-graphite brush, manufactured according to the method described above, can absorb moisture existent in the atmosphere, as long as the metal-graphite brush is left in atmospheric air.

If the metal-graphite brush described above is employed in a motor, when the metal-graphite brush is operated, the temperatures of the slidable-contacting surfaces of the metal-graphite brush and of the commutator rise. Accordingly, moisture, originally contained in inner porosities located near the slidable contacting surfaces of the metal-graphite brush, starts to vaporize. Then, the vaporized moisture is provided between the slidable contacting surfaces of the metal-graphite brush and the commutator. Therefore, because a coefficient of sliding friction between the slidable contacting surfaces of the metal-graphite brush and the commutator is lowered, in other words, because of the effects of gaseous lubrication, the degree to which the metal-graphite brush wears can be reduced.

If the motor including the metal-graphite brush described above is utilized for a vehicle, because of the influence of heat generated by an engine accommodated in an engine room of the vehicle, the temperatures of the slidable contacting surfaces of the metal-graphite brush and of the commutator may on occasions rise to 100° C. or more during operation of the motor. In these circumstances, moisture that was originally absorbed by the porosities of the metal-graphite brush tends to vaporize at a significantly higher rate than the rate of vaporization that would occur at a room temperature. Accordingly, the motor begins operation in conditions where there is a lack of vapor between the slidable contacting surfaces of the metal-graphite brush and the commutator. Therefore, a coefficient of sliding friction between the slidable contacting surfaces of the metal-graphite brush and the commutator rises, a phenomenon that tends to lead easily to wearing of the metal-graphite brush.

Accordingly, when the conventional metal-graphite brush described above is utilized in conditions of high temperature, in contrast with circumstances where it is utilized at room temperature, the degree of wear relative to a unit operation time rises. As a result, longevity of the motor, including that of the metal-graphite brush described above, is adversely affected.

A need thus exists for a metal-graphite brush, which is hard to wear, and has long period of longevity, and a motor including such a metal-graphite brush. The present invention has been made in view of the above circumstances and provides such a metal-graphite brush and such a motor.

SUMMARY OF THE INVENTION

According to an aspect of the present invention, a metal-graphite brush for supplying electricity to a coil wound around a core provided at a rotor of a motor is made of sintered material having porosities at a surface of, or inside, the sintered material. The metal-graphite brush is infiltrated by a liquid containing a plurality of kinds of glycol ether having varying numbers, of alkylene oxide structure units. The liquid has a boiling point higher than that of water.

According to a further aspect of the present invention, a metal-graphite brush for supplying electricity for a coil wound around a core provided at a rotor of a motor is made of sintered material having porosities at a surface of, and inside, the sintered material. The metal-graphite brush is infiltrated by a liquid containing a plurality of kinds of glycol ether having varying vaporization properties. The liquid has a boiling point higher than water.

According to a further aspect of the present invention, a motor includes a housing, a magnet provided in the housing, a rotor rotatably provided in the housing so as to face the magnet, and having a coil wounded around a core of the rotor, a shaft for supporting the rotor to the housing, a commutator provided at the rotor for supplying electricity to the coil, and a metal-graphite brush that makes contact with the commutator. The metal graphite brush is made of sintered material having porosities at a surface of, and inside, the sintered material. The metal-graphite brush is infiltrated by a liquid containing a plurality of kinds of glycol ether having varying numbers of alkylene oxide structure units. The liquid has a boiling point higher than that of water.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
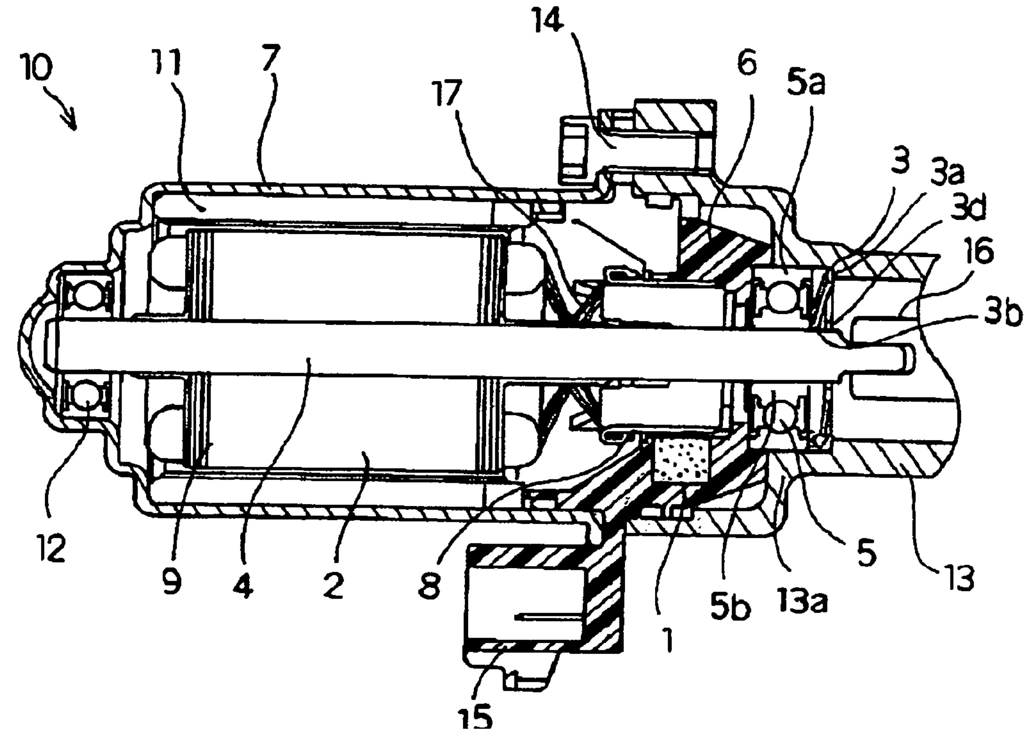
FIG. 1 represents a cross-sectional view illustrating a configuration of a motor in which a metal-graphite brush according to an embodiment of the present invention is utilized.

An embodiment of the present invention will be explained. A metal-graphite brush according to the embodiment of the present invention supplies electricity to a coil wound around a core provided at a rotor of a motor. The metal-graphite brush is made of sintered material having porosities on both the surface and the interior of the sintered material. Liquid having a boiling point higher than the boiling point of water, and containing plural kinds of glycol ether that contain varying numbers of alkylene oxide structure units, infiltrates the porosities. Here, a term "alkylene oxide structure unit" indicates a structure unit originating in alkylene oxide, but not limited. The term "alkylene oxide structure unit" also includes a structure unit corresponding the structure unit described above, obtained by other reactions, or syntheses. As a result, even when the temperature of the motor rises to 100° C. or more, liquid that has infiltrated the porosities of the metal-graphite brush does not completely vaporize. Thus, vapor existing between the slidable contacting surfaces of the metal-graphite brush and the commutator does not disappear. Therefore, a coefficient of sliding friction between the slidable contacting surfaces of the metal-graphite brush and the commutator can be lowered, and the degree of wear of the metal-graphite brush can be reduced in comparison with the degree of wear that would occur in the case of a conventional metal-graphite brush. In addition, a molecular weight of glycol ether varies with the number of alkylene oxide structure units included. In other words, the liquid described above contains plural kinds of glycol ether having varied properties of vapor pressure. Thus, even when the metal-graphite brush is utilized over a wide range of temperatures, vapor can be generated from the liquid and be provided between the slidable contacting surfaces of the metal-graphite brush and the commutator. Accordingly, in the metal-graphite brush according to the embodiment of the present invention, the degree of wear of the metal-graphite brush can be reduced even when the metal-graphite brush is utilized over a wide range of temperatures.

As the alkylene oxide structure described above, any one of alkylene oxide structures can be utilized. In particular, because glycol ether containing at least either an ethylene oxide structure unit or a propylene oxide structure unit is easy to handle, it is preferable that the alkylene oxide structure unit contain at least either an ethylene oxide structure unit or a propylene oxide structure unit. Moreover, sufficient vapor pressure can be obtained from these glycol ethers over a range of temperatures in which a motor is generally utilized. Therefore, when the motor is utilized, the vapor of the liquid can always be provided between the slidable contacting surfaces of the metal-graphite brush and the commutator. Thus, the degree of wear of the metal-graphite brush can be restricted in low level.

A motor including the metal-graphite brush according to the embodiment of the present invention includes a housing; a magnet provided in the housing; a rotor rotatably provided in the housing so as to face the magnet, and having a coil wound around a core; a shaft for supporting the rotor in relation to the housing; a commutator for supplying electricity to the coil, and a metal-graphite brush slidably contacting with the commutator. The metal-graphite brush is made of sintered material having porosities on both the surface and the interior of the metal-graphite brush. Liquid, having a boiling point higher than the boiling point of water, and containing plural kinds of glycol ether that contain a varied number of alkylene oxide structure units, infiltrates the porosities. As a result of this, even when the motor is utilized in conditions of a temperature of 100° C. or more, the liquid that has infiltrated the porosities of the metal-graphite brush does not completely vaporize, and vapor from the liquid does not disappear between the slidable contacting surfaces of the metal-graphite brush and the commutator. Therefore, a coefficient of sliding friction between the slidable contacting surfaces of the metal-graphite brush and the commutator can be lowered, and the degree of wear of the metal-graphite brush can be reduced. As a result of this, the longevity of a motor having the metal-graphite brush can be increased. In addition, molecular weight of the glycol ether varies commensurately with the number of the alkylene oxide structure units included. In other words, the vapor from the liquid described above contains plural kinds of glycol ether having varieties of properties of vapor pressure. Accordingly, the vapor from the liquid can be provided between the slidable contacting surfaces of the metal-graphite brush and the commutator over a wide range of temperatures at which the metal-graphite brush is utilized. Thus, in the metal-graphite brush according to the embodiment of the present invention, because the degree of wear can be reduced over a wide range of temperatures at which the metal-graphite brush is utilized, longevity of a motor including the metal-graphite brush can be enhanced.

An embodiment of the present invention will be explained with reference to drawing figures. FIG. 1 represents a cross-sectional view illustrating a configuration of a motor 10 including a metal-graphite brush 1 (simply referred hereinafter as a brush) for supplying electricity to a rotor 2. First, a configuration of the motor 10 will be briefly explained with reference to FIG. 1.

In the motor 10, illustrated in FIG. 1, the rotor 2 rotates within a housing 7. The rotor 2 is rotatably provided in the housing 7 that has a cylindrical shape and is made of metal. The housing 7 is fastened to a housing 13 by means of a fastening member 14 such as a bolt, and thus integrated into a unit with the housing 13. The rotor 2 is supported by a shaft 4. The shaft 4 has two parallel planes provided at one end of the shaft 4 (right side in FIG. 1). From an axial direction to be connected with the driven shaft 16, the two parallel planes of the shaft 4 are inserted into an approximately rectangular hole provided at one end of a driven shaft 16 of a driven machine. Thus, the shaft 4 is connected to the driven shaft 16, and a rotation of the rotor 10 can be externally transmitted through the driven shaft 16.

A core 9 of the rotor 2 is formed by layering plural metal plates in an axial direction. The shaft 4 is inserted through a center of the core 9 by means of pressing and integrated into a unit with the core 9. Thus, the rotor 2 and the shaft 4 rotate together as a unit. The other end of the shaft 4 is inserted into an inner ring of a bearing (a first bearing) 12, pressed and fitted into one end of the housing 7, and thus rotatably supported in the housing 7 by means of the bearing 12. On the other hand, along an inner surface of the cylindrical housing 7, plural arc-shape magnets 11 are attached by means of an adhesive, or the like, in a peripheral direction.

Further, the housing 13, to which the housing 7 is attached, includes a recessed portion 13*a* provided at a motor-attachment surface of the housing 13 for attaching the rotor 2. An outer ring 5*a* of the bearing 5 is pressed into the recessed portion 13*a*. The shaft 4 is supported by the bearing 5. Thus, the shaft 4 for supporting the rotor 2 is rotatably supported by the two bearings 5, 12 at both ends of the shaft 4. In this case, the opposite end of the shaft 4, opposite to the position into which the bearing 12 is pressed, is pressed into an inner ring 5*b* of the bearing 5. The outer ring 5*a* of the bearing 5 is pressed into the inner side of the recessed portion 13*a* of the housing 13 so as to be provided along the inner diameter of the recessed portion 13*a*. In addition, a spring 3 is provided between the housing 13 of the motor 10 and the bearing 5.

The spring 3 is made from a disk-shape plate of metal having strong elasticity (a high spring constant). The disk-shape plate has a hole 3*d* at the center. The shaft 4 is penetrated through the hole 3*d*. The disk-shape plate has three slits in a radial direction positioned at distances of 120°. Each slit has an extending slit portion extending clockwise (or counter clockwise) along a peripheral direction of the disk-shape plate. The disk-shape plate is bended in an axial direction into a three-dimensional form so as to form biasing portions 3*b* contiguous with supporting portions 3*a*. The supporting portions 3*a* of the spring 3 make contact with a peripheral stepped portion of the recessed portion 13*a* so as to engage with the same. The biasing portions 3*b* of the spring 3 make contact with a side surface of the outer ring 5*a* of the bearing 5 so as to bias the bearing 5 in an axial direction (left direction in FIG. 1).

On the other hand, a holder 6 is provided near the bearing 5 so as to face the rotor 2. The holder 6 is made of resin, and is provided so as to have the same axis as the housing 7. In addition, the holder 6 includes two brushes 1 (only one of the brushes is illustrated in FIG. 1) for supplying electricity from the commutator 8 to the coil 17, wound around the core 9 provided at the rotor 2, by making contact with the commutator 8. In addition, a connector 15 for supplying electricity from the exterior to the rotor 2 through the brush 1 is provided at the holder 6 so as to form an integral unit with the holder 6. When an external connector (not illustrated) is connected to the connector 15, electricity can be supplied, through the brush 1, to the coil 17 wound around the core 9 of the rotor 2. When electricity is supplied to the coil 17, electromagnetic force of attraction and repulsion is generated between the rotor 2 and the magnets 11, and the rotor 2 starts to rotate.

Figure 2:
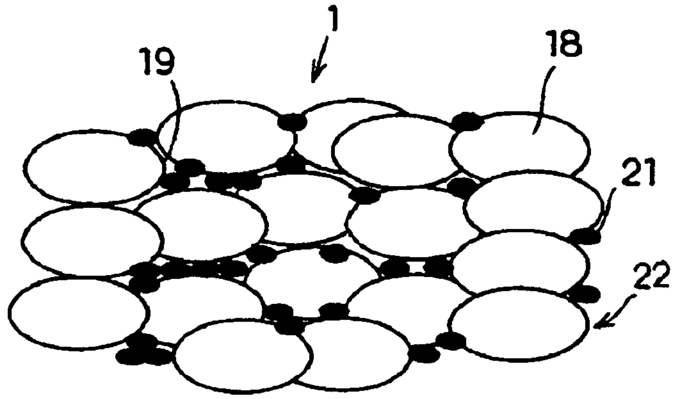
FIG. 2 represents a patterned diagram illustrating a composition of the metal-graphite brush.

The brush 1, employed in the motor 10 configured and operated as above, will be explained in detail below. The brush 1, according to the embodiment of the present invention, is made of a sintered material 22 having a base of natural graphite particles 18, as illustrated in FIG. 2. The sintered material 22 includes a number of porosities 19 on both the surface and the interior of the sintered material 22. Firstly, an example of a manufacturing method of the sintered material 22, which can be made into the brush 1, will be explained with reference to FIG. 3.

For manufacturing the brush 1, natural graphite particles 18 (particle diameter: approximately from 5 μm to 50 μm), and novolac-type (or resoll-type) phenol resin of granular pellets, 2–3% by weight, as expressed in terms of the graphite particles 18 being 100%, are prepared. (S1). Then, the novolac-type (or resoll-type) phenol resin is dissolved in alcohol so as to make a phenol resin solution (S2). As the alcoholic solvent, methyl alcohol, or the like, can be utilized in this step. In addition, alcohol is not limited. For solving the phenol resin, ketones, such as acetone, can also be utilized. In other words, in the step of solving the phenol resin, a thickness of film formed on the surface of the graphite particles varies commensurately with the viscosity of the dissolved phenol resin added to the graphite particles 18. After that, dissolved resin, in other words, the phenol resin dissolved in the alcohol, is sprayed over the natural graphite particles (S3). In the spraying step (S3), the dissolved resin is sprayed so as to form a uniform film of dissolved resin on the surface of the graphite particles 18.

Next, the graphite particles 18 are mixed, with the dissolved resin that has been sprayed onto the surface (S4). In this step of mixing, the graphite particles 18 are mixed by use of a mixing apparatus for a predetermined duration (for example, from approximately 3 to 5 hours) so as to homogenize the graphite particles 18. After that, the graphite particles that have been homogenized are left in atmospheric air conditions for 30 minutes so as to be dried (S5).

Next, the graphite particles (graphite granulation particles) 18, obtained by the preceding process of drying, are mixed with copper powder in order to restrict, during the operation of the motor, the level of current flowing into the brush 1 to within a predetermined current density, corresponding to the level of electric current that it is intended to apply to the brush 1 (S6). At the same time, in order to improve a sliding property with the commutator 8, it is preferable that a solid lubricant such as molybdenum disulfide also be mixed. By these processes, the copper powder and the molybdenum disulfide are mixed, and thus homogenized (S7). After that, by means of pressing, or the like, a brush 1 of a desired shape can be formed by use of a pressing apparatus (S8). Then, a product obtained by the process of pressing is sintered, for from 2 to 3 hours (S9), in a nitrogen-rich atmosphere at a temperature of from 700° C. to 800° C. (S9). Thus, a sintered material 22 with the shape of a brush is made. On both the surface and the inside of the sintered material 22, which has been made up according to the processes described above, as illustrated in the process diagram of FIG. 2, multiple porosities 19 are formed between adjacent graphite particles.

Figure 3:
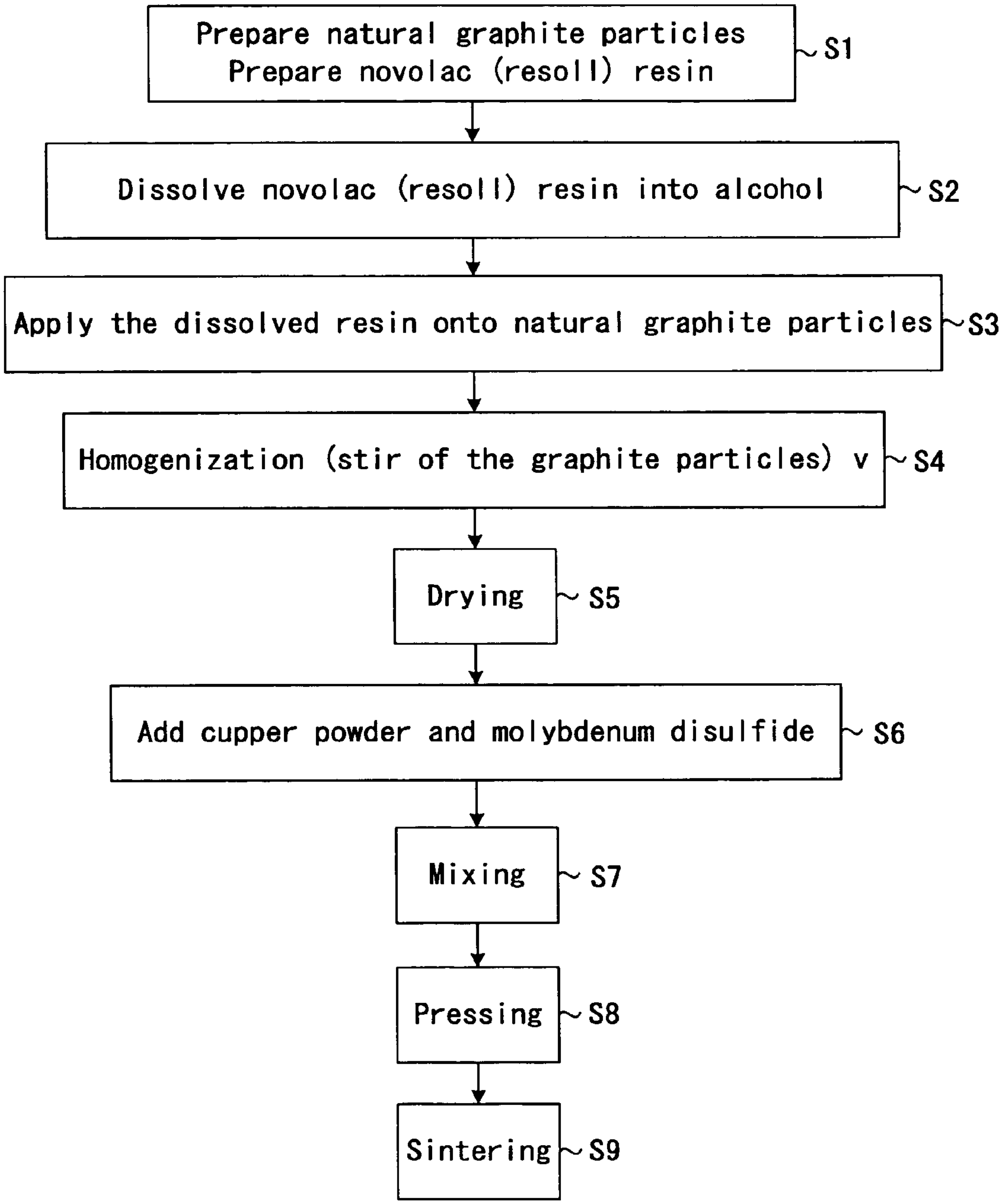
FIG. 3 represents a process diagram illustrating a process of manufacturing the metal-graphite brush.
Figure 4:
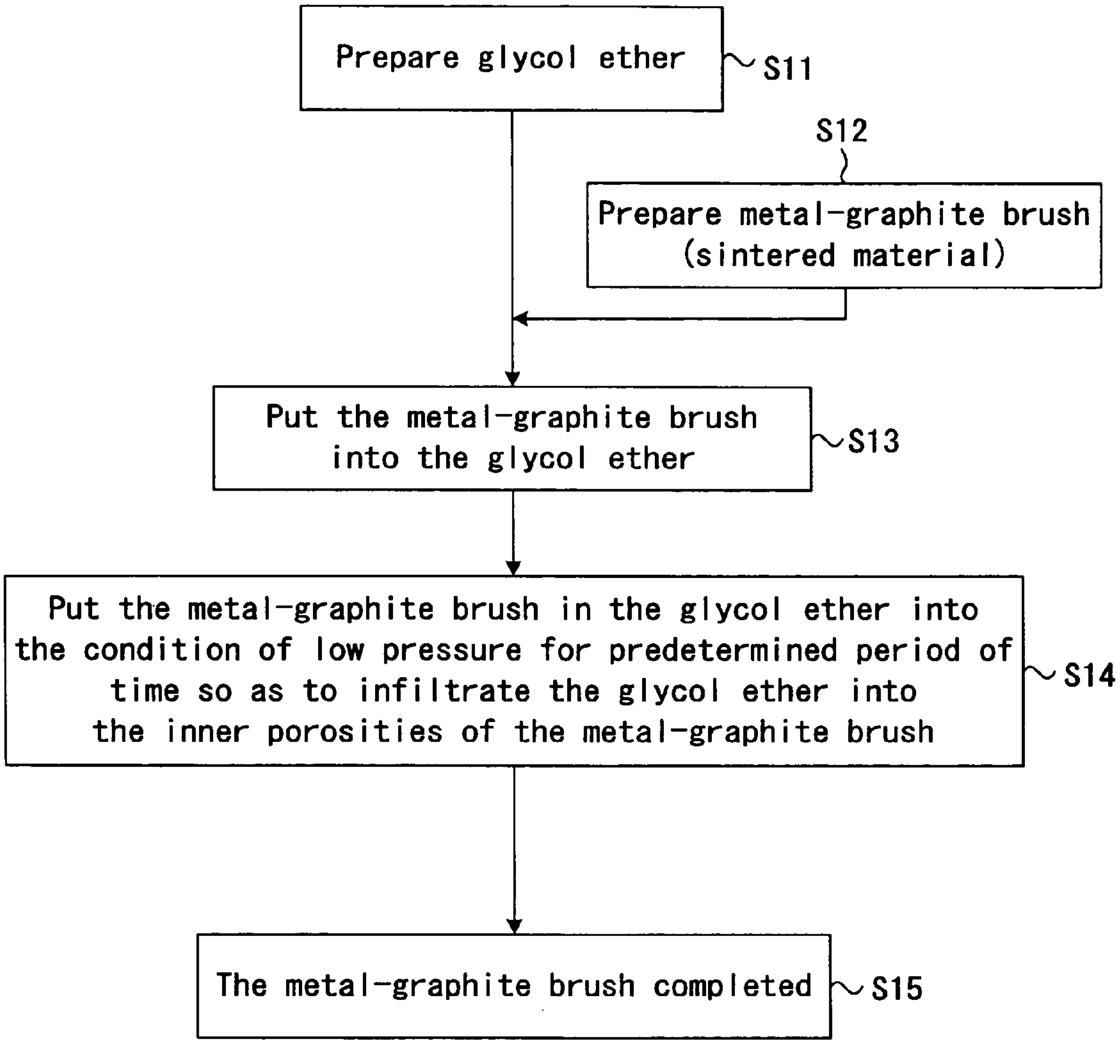
FIG. 4 represents a process diagram illustrating a process of infiltration of a liquid into the metal-graphite brush.

Next, with reference to FIG. 4, a process for infiltrating the liquid 21 into the porosities 19 formed at the sintered material 22, which has been made up by the processes described in FIG. 3, will be explained below.

Processes for infiltrating the liquid 21 containing plural kinds of glycol ether into the porosities 19 of the sintered material 22 as the brush 1 are as follows. First, plural kinds of glycol ether are prepared for making the liquid 21 (S11). Next, the sintered material 22, made by a process of sintering, and that is to become a brush 1, is prepared (S12), and put into the glycol ether (S13). Then, the sintered material 22 in the glycol ether is left in a condition of low pressure of approximately 133 Pa for a predetermined period of time (for example for from 1 to 2 minutes) so as to remove atmospheric air originally included in the porosities 19, and so as instead to feed the glycol ether into the porosities. Thus, the glycol ether is infiltrated into the porosities 19 (S14). After the atmospheric gas containing moisture originally included in the porosities 19 of the sintered material 22 is completely replaced by the solution of glycol ether, the sintered material 22 in the glycol ether is restored to a condition of atmospheric pressure. Thus, a metal-graphite brush according to the embodiment of the present invention is completed in which the glycol ether has been infiltrated into the porosities formed both at the surface and in the interior of the sintered material 22 (S15).

During the processes described above, the process of infiltrating the liquid 21 into the porosities 19 formed at the sintered material 22 of the brush 1, and the process of retaining the liquid 21 in the porosities 19 formed in the sintered material 22, the atmospheric gas originally included in the porosities 19 of the sintered material 22 is replaced by the liquid 21. In the processes described above, only the liquid 21 containing the glycol ether was infiltrated. However, the liquid 21 is not limited to one containing only the glycol ether described above. The liquid 21 can also contain other kinds of substances. Even in these circumstances, the liquid 21 can be infiltrated by means of similar processes. In other words, by preparing the liquid 21 containing other kinds of substances in the step S11 described above, the metal-graphite brush 1 according to the embodiment of the present invention can be made.

By utilizing the metal-graphite brush 1 according to the embodiment of the present invention, when the motor is in operation (in other words, when the brush is slidably contacting), a coefficient of sliding friction of the slidable contacting surfaces can be lowered by the existence of vapor from the liquid 21 between the slidable contacting surfaces of the brush 1 and the commutator 8. Moreover, even when the brush 1 is operated in conditions where the temperature of the brush 1 rises above 100° C., if the temperature is lower than the boiling point of the liquid 21, the liquid 21 does not completely vaporize, and the liquid 21 provided between the slidable contacting surfaces of the brush 1 and the commutator 8 does not completely disappear. Accordingly, unlike in the case of conventional brushes, increases in the coefficient of sliding friction, which causes an increase of the degree of wear of the brush 1, can be prevented. As a result, longevity of the motor 10 can be substantially extended.

On the other hand, concomitantly with the introduction of electric vehicles, the motor 10 has also gradually come to be utilized in parts for engine systems, and in control systems for a vehicle. In particular, when engine parts such as a water pump or an oil pump are intended to be replaced by electric motors, the electric motor need to be applicable for substantially longer continuous operation times than those of vehicle body parts such as an electric window system. Continuous operation times achieve several hours in some cases. Because continuous operation times of the motor 10 have become longer, there is a danger of the average temperature of the slidable contacting surfaces of the brush 1 rising from 150° C. up to approximately 250° C. In such circumstances, it is preferable that, even when the motor 1 is utilized in any atmospheric temperature, vapor from the liquid 21 exist between the slidable contacting surfaces.

However, as is common with liquids having a boiling point, vapor pressure of the liquid rises abruptly when the temperature of the liquid rises to close to boiling point, and the vapor pressure of the liquid becomes atmospheric pressure of 1 at boiling point. Therefore, much of vapor of the liquid 21 which has infiltrated into the porosities 19 of the brush 1 under low pressure-conditions does not vaporize until the temperature of the porosities 19 near the slidable contacting surface of the brush 1 approaches the boiling point of the liquid 21. In addition, if the brush 1 is utilized at a temperature close to boiling point, because the vapor pressure is heavy, and thus much of the liquid 21 is consumed, the vapor can not be sufficiently supplied to the slidable contacting surfaces of the brush 1 over a long period of time.

In order to overcome the defects described above, as the liquid 21 to be infiltrated into the porosities 19 of the brush 1, a liquid containing plural kinds of glycol ether, having a variety of alkylene oxide structure units, and having a variety of boiling points higher than that of water (100° C.), is utilized. In other words, the boiling points of the glycol ethers are varied with the number, or kinds, of alkylene oxide structure units. In particular, the higher the number of alkylene oxide structure units, the heavier becomes the molecular weight of the glycol ether, and the higher becomes the boiling point of the glycol ether. As a result, glycol ethers having a boiling point distributed over a wide range of temperatures can be infiltrated. In particular, if a mixture containing plural kinds of glycol ether, and having a varied number of alkylene oxide structure units, is utilized as the liquid 21, because the boiling point of the glycol ether rises commensurately with the increase in the number of alkylene oxide structure units, the vapor of the liquid 21 can be provided between the slidable contacting surfaces over a wide range of temperatures.

The ether structure unit is not limited. Any ether structure unit can be applicable if the ether structure unit has a vaporization property corresponding to temperature range of the slidable contacting surface. For example, the ether structure unit can be arbitrarily selected from among monomethyl, monoethyl, monopropyl, monoisopropyl, monobutyl, monoisobutyl, or monophenyl, or combinations thereof. In addition, if identical ether structure units are selected, the level of compatibility can be enhanced.

For example, if ethylene oxide structure unit is selected as the alkylene oxide structure unit, the boiling point of the ethylene glycol monomethyl ether having one ethylene oxide structure unit is 124.5° C. The boiling point of a diethylene glycol monomethyl ether having two ethylene oxide structure units is 194.0° C. The boiling point of a triethylene glycol monomethyl ether having three ethylene oxide structures is 249.0° C. Thus, the boiling point increases commensurately with the increase in the number of ethylene oxide structure units. When such compounds are infiltrated, within a predetermined temperature range, the effects of gaseous lubrication can be achieved without discontinuity in temperature.

In addition, it is preferable that the liquid 21 be decomposed in a temperature higher than the maximum temperature of the slidable contacting surface of the metal-graphite brush 1 in contact with the slidable contacting surface of the commutator 8 for supplying electricity to the coil 17 during operation of the motor. In addition, it is preferable that during operation of the motor, the liquid 21 contain glycol ether that has a boiling point higher than the maximum temperature of the slidable contacting surface. In addition, it is preferable that during operation of the motor, the liquid 21 contain glycol ether that can be vaporized at a temperature surrounding the slidable contacting surface. In this way, even when the temperatures of the slidable contacting surfaces of the brush 1 and the commutator 8 vary over a wide range, as long as the temperatures of the slidable contacting surfaces of the brush 1 and the commutator 8 stay within the temperature range within which the motor 10 can be utilized, the liquid 21 can not be decomposed thermally, and the vapor of the liquid 21 can be provided between the slidable contacting surfaces.

On the other hand, in the case of a conventional metal-graphite brush, when the meta-graphite brush is continuously operated for 100 hours, although, when the average temperature of the slidable contacting surface is up to 80° C., the brush wears at an approximately constant rate of wear, when the average temperature of the slidable contacting surface exceeds approximately 80° C., the rate of wear begins to intensify commensurately with the increase in temperature. It is believed that the reason for this is that the amount of consumption of moisture per unit time increases after the temperature exceeds 80° C., and before 100 hours have elapsed following the start of the motor 1 operation, the moisture stored in the porosities 19 ceased to exist. In other words, the higher the average temperature of the slidable contacting surface of the metal-graphite brush 1, the higher the degree of moisture becomes vaporized from moisture originally absorbed by the graphite particles 18. As a result, the amount of moisture required for restricting wear of the metal-graphite brush 1 becomes insufficient after the lapse of a specific continuous period of operation time, and when the motor is operated after the degree of moisture has become insufficient, wear of the metal-graphite brush 1 proceeds.

Accordingly, because it is clear that the wear of the metal-graphite brush 1 can be restricted by means of water up to 80° C., it is preferable that, as a liquid that can be vaporized within a low temperature range of up to 80° C., water be utilized for the metal-graphite brush according to the embodiment of the present invention. If water is utilized, when the motor 10 starts operation, vaporization at first occurs from consumption of the water solution of the liquid 21, concomitantly with the increase in temperature of the slidable contacting surface of the brush 1. Once the motor 10 stops, and the temperature of the brush 1 drops to approximately room temperature, the brush 1 can absorb moisture from the atmospheric air into the porosities 19, and thus augment the moisture. From such viewpoints, it is preferable that each of the liquids contained in the liquid 21 be water-soluble. In addition, it is preferable that the liquid 21 be infiltrated as the water solution. Further, in terms of improving efficiency in absorbing moisture from atmospheric air, it is preferable that at least one of the plural kinds of glycol ether contained in the liquid 21 have a hygroscopic property. By also including the glycol ether having a hygroscopic property in the liquid 21, water can be supplied from atmospheric air. Therefore, the amount of water infiltrated in advance into the porosities 19 of the sintered material 22 of the brush 1 can be reduced, and on occasions, infiltration of water becomes unnecessary.

A first preferred embodiment of the liquid 21 infiltrated into the metal-graphite brush 1 will be explained. As a preferred liquid 21 for infiltration, as indicated by following formula of chemical structure, monomethyl ether having an ethylene oxide structure unit as the alkylene oxide structure unit can be employed.

(Formula of Chemical Structure 1)

$$CH_3O-(CH_2CH_2O)_n-H$$

This substance can be obtained by adding ethylene oxide to methanol by use of a catalyst. By this method, polyethylene glycol monomethyl ether of a composition ratio of n=3, approximately 5%, n=4, approximately 68%, n=5, approximately 22%, and n=6, approximately 5% can be obtained. The average molecular weight of the mixture of the polyethylene glycol monomethyl ether is approximately 220. From the viewpoint of a vaporization property, the polyethylene glycol monomethyl ether having a composition ratio of n=3, from 2 to 8%, n=5, from 20 to 25%, n=6 from 2 to 8%, and n=4, the balance, is preferable.

Figure 5:
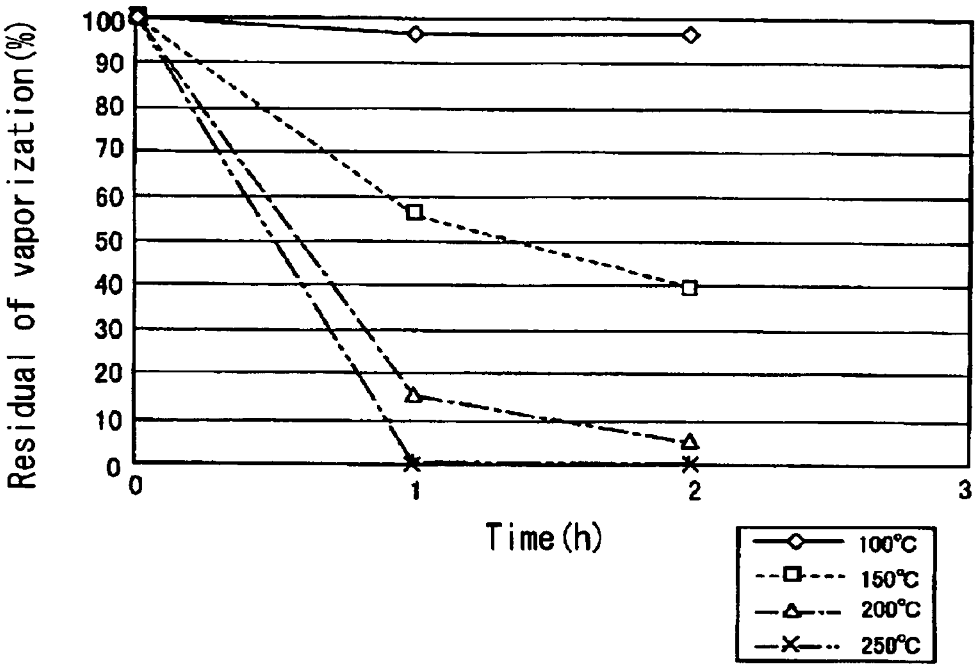
FIG. 5 represents a graph indicating a vaporization property of polyethylene glycol monomethyl ether.

A vaporization property of the polyethylene glycol monomethyl ether, infiltrated into the inner porosities of the metal-graphite brush 1, was investigated. According to the results, as illustrated in FIG. 5, 5.6% of the polyethylene glycol monomethyl ether remains in the inner porosities of the metal-graphite brush 1 after the brush 1 has been maintained at a temperature of 200° C. for a period of 2 hours. Thus, the vapor of the polyethylene glycol monomethyl ether can be provided between the slidable contacting surfaces over a wide range of temperatures of between 100° C. and 200° C.

Figure 6:
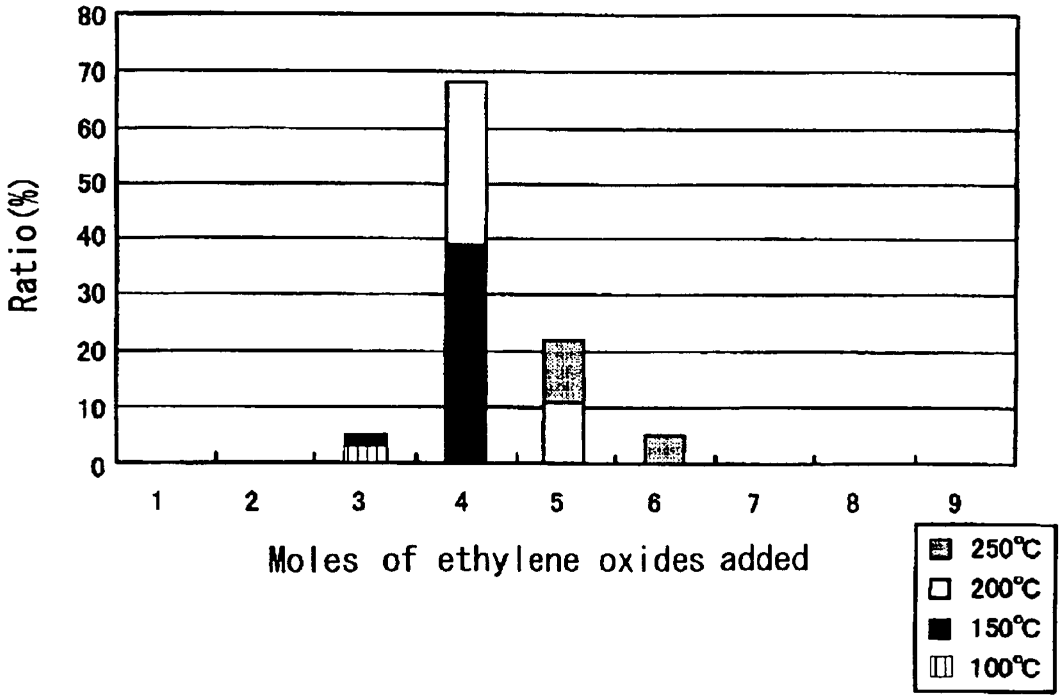
FIG. 6 represents a graph indicating a composition ratio of the polyethylene glycol monomethyl ether vaporized at varying temperatures.
Figure 7:
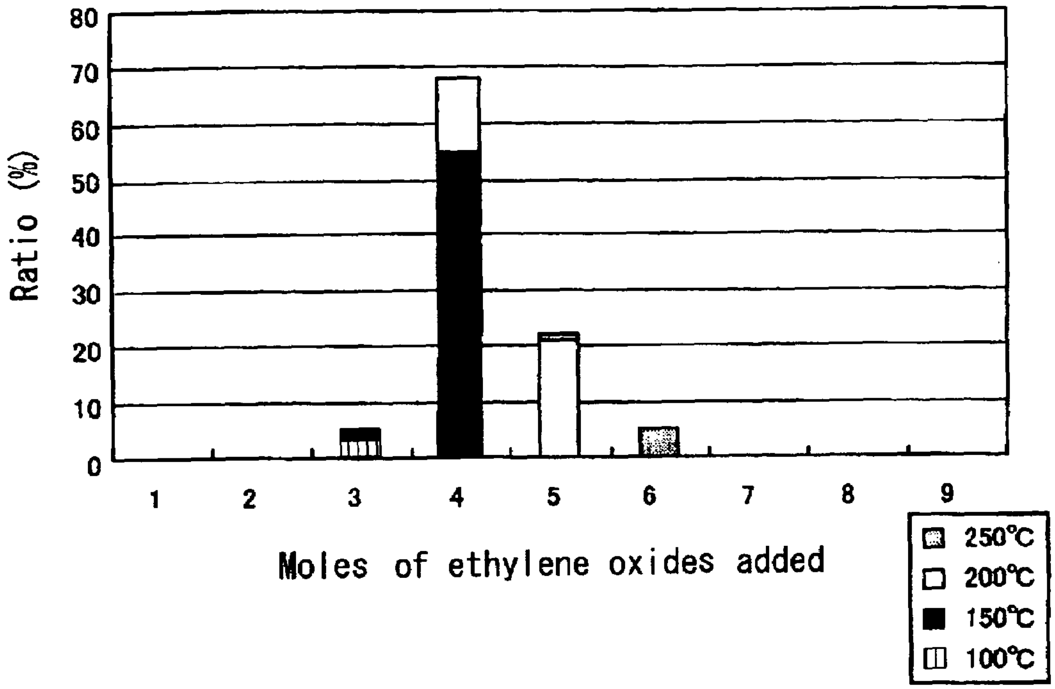
FIG. 7 represents a graph indicating a composition ratio of the polyethylene glycol monomethyl ether vaporized at varying temperatures.

In addition, for a polyethylene glycol monomethyl ether having a composition described above, the ratio of constituents vaporized at each temperature was estimated, and illustrated in FIGS. 6 and 7, due consideration being given to the investigation of the amount of residual of vaporization described above, and to the known vaporization property of the polyethylene glycol monomethyl ether. FIGS. 6, and 7 represent graphs indicating composition ratios of polyethylene glycol monomethyl ether that has vaporized after being left in temperature conditions of both 1 hour (FIG. 6), and 2 hours (FIG. 7). In these cases, the polyethylene glycol monomethyl ethers are assumed to vaporize in ascending order of the boiling points thereof. According to the estimation, constituents vaporized vary with the temperature. Accordingly, because some constituents vaporize at 150° C. of which the moles of alkylene oxides added are 3 or 4, and the other constituents vaporize at 200° C. of which the moles of alkylene oxides added are 4 or 5, the liquid 21 can be vaporized over a wide range of temperature. Further, the vaporization property can be controlled by varying the moles of alkylene oxides added to the constituents of polyethylene glycol monomethyl ether on the basis of the operation temperature of the motor 10.

Figure 8:
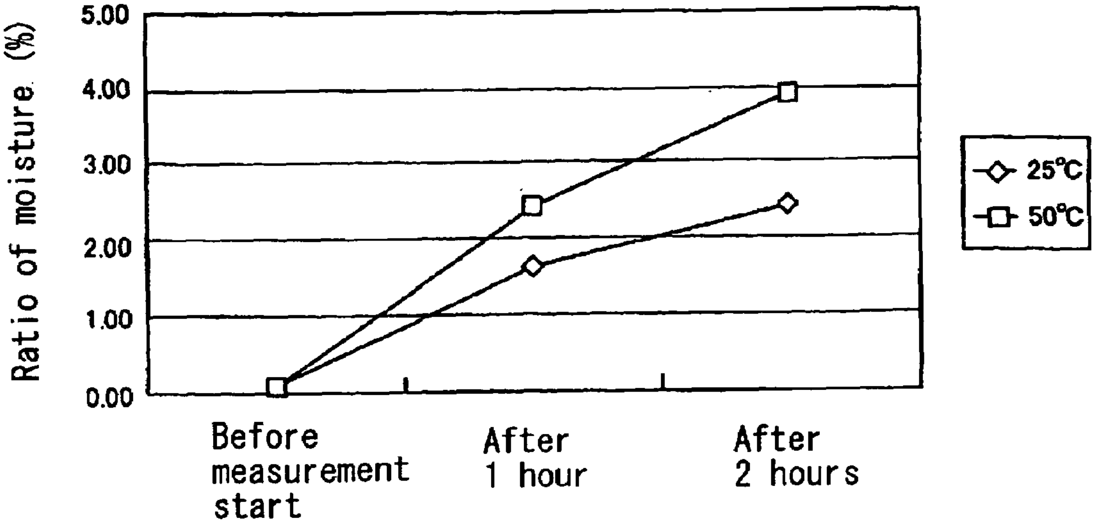
FIG. 8 represents a graph indicating a hygroscopic property of the polyethylene glycol monomethyl ether.

In addition, the polyethylene glycol monomethyl ether has a hygroscopic property, as illustrated in FIG. 8. FIG. 8 represents a graph illustrating changes in the amount of moisture absorbed by the polyethylene glycol monomethyl ether left in conditions of a relative humidity (RH) of 50%, with time elapse, investigated in conditions at different temperatures. Then, according to a measurement of a thermogravimetric analysis (TGA), the thermal decomposition temperature was 246.1° C. According to an investigation into thermal decomposition performed at a temperature of 294° C., the change of weight was 0.55%. Accordingly, because the polyethylene glycol monomethyl ether has a hygroscopic property, and is not decomposed up to 294° C., the polyethylene glycol monomethyl ether can be preferably utilized as the liquid 21.

Further, as a second preferred embodiment, monomethyl ether, having an ethylene oxide structure unit and a propylene oxide structure unit as alkylene oxide structure units, can also be utilized as the liquid 21.

(Formula of Chemical Structure 2)

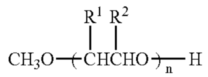

($R^1$, $R^2$ are H or $CH_3$, and $R^1 = R^2 \neq CH_3$)

The monomethyl ether having an ethylene oxide structure unit and a propylene oxide structure unit as alkylene oxide structure units, can be made by following processes. First, methanol is used as a material. Next, ethylene oxide and propylene oxide are randomly added to the methanol by use of a catalyst. Thus, a mixture of polyethylene polypropylene glycol monomethyl ethers can be obtained, having a composition ratio of n=1, approximately 1%, n=2, approximately 8%, n=3, approximately 22%, n=4, approximately 24%, n=5, approximately 20%, n=6, approximately 13%, n=7, approximately 7%, n=8, approximately 3%, and n=9, approximately 2%. Here, n indicates a sum of moles of ethylene oxide and/or propylene oxide added. The average molecular weight of the mixture of polyethylene polypropylene glycol monomethyl ether is approximately 200. The composition ratio is not particularly limited. From the viewpoint of vaporization property, a polyethylene polypropylene glycol monomethyl ether having a composition ratio of n=1, from 0 to 2%, n=2, from 7 to 10%, n=3, from 20 to 25%, n=5, from 20 to 25%, n=6, from 10 to 15%, n=7, from 7 to 10%, n=8, from 2 to 5%, n=9, from 0 to 2%, and n=4, the balance, is preferable.

Figure 9:
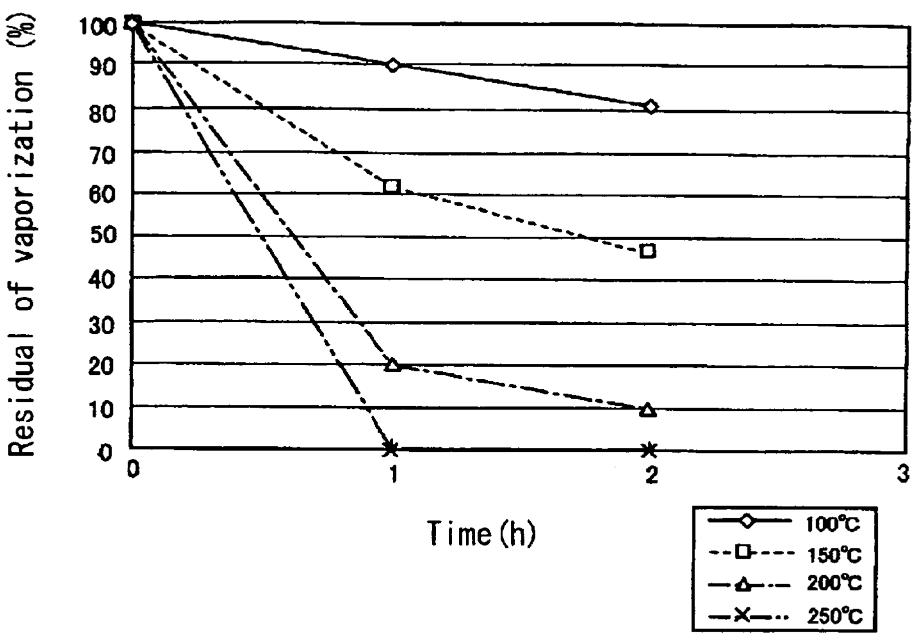
FIG. 9 represents a graph indicating a vaporization property of polyethylene polypropylene glycol monomethyl ether.

A vaporization property of the polyethylene polypropylene glycol monomethyl ether, infiltrated into the inner porosities 19 of the metal-graphite brush 1, was investigated. According to the results, as illustrated in FIG. 9, 10% of the polyethylene polypropylene glycol monomethyl ether remains in the inner porosities of the metal-graphite brush 1 after being maintained at a temperature of 200° C. for a period of 2 hours. Thus, the vapor of the polyethylene polypropylene glycol monomethyl ether can be provided between the slidable contacting surfaces over a range of temperatures wider than the range of temperatures in cases in which the polyethylene glycol monomethyl ether was utilized.

Figure 10:
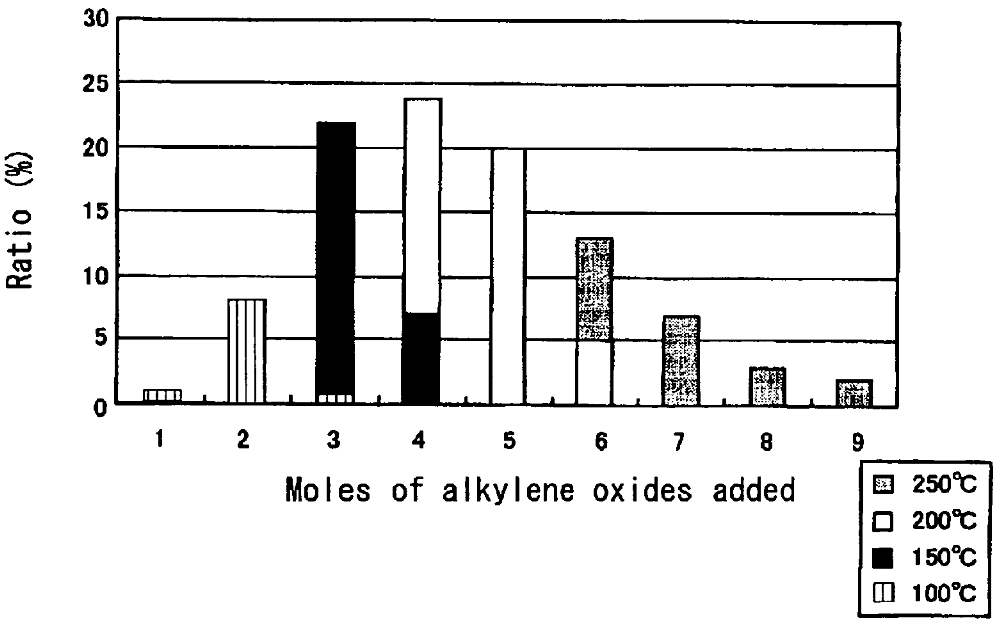
FIG. 10 represents a graph indicating a composition ratio of the polyethylene polypropylene glycol monomethyl ether vaporized at varying temperatures.
Figure 11:
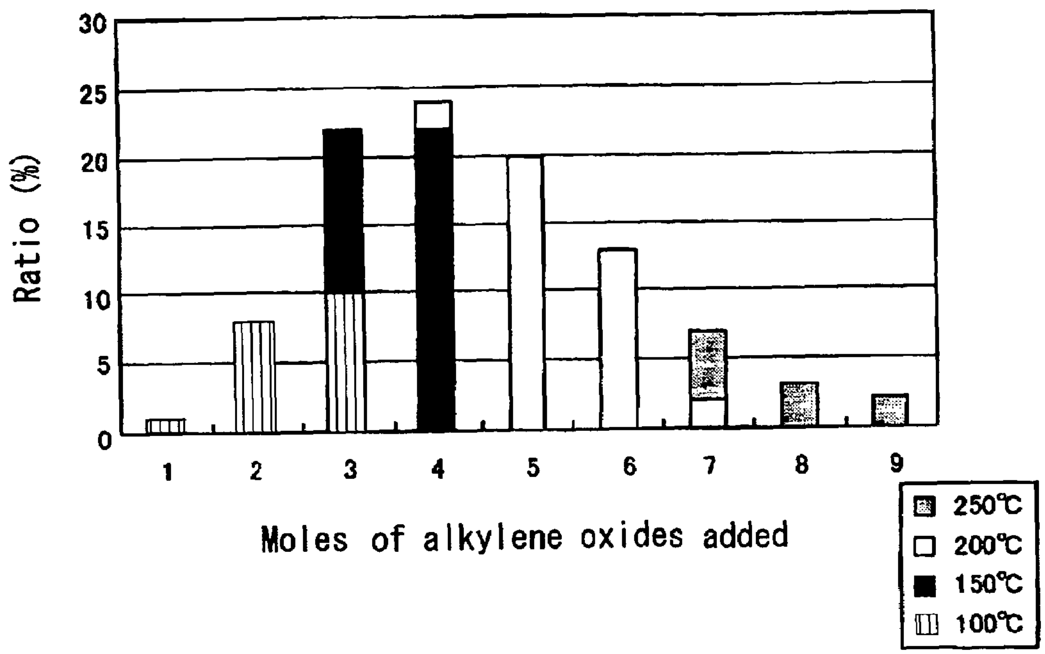
FIG. 11 represents a graph indicating a composition ratio of the polyethylene polypropylene glycol monomethyl ether vaporized at varying temperatures.

Further, on the basis of the results described above, assuming that the polyethylene polypropylene glycol monomethyl ethers vaporize in ascending order of boiling point, in the same way as in the case of the polyethylene glycol ether, constituents vaporized at each temperature are illustrated in FIG. 10 and FIG. 11. FIG. 10 illustrates constituents that have vaporized for 1 hour, and FIG. 11 illustrates constituents that have vaporized for 2 hours. A sum of the number of ethylene oxides and the number of propylene oxides is deemed to be the moles of alkylene oxides added. According to the graph illustrated in FIG. 11, for example, after 2 hours have passed, because some constituents vaporize at 150° C. of which the moles of alkylene oxides added are 3 or 4, other constituents vaporize at 200° C. of which the moles of alkylene oxides added are from 4 to 7, and other constituents vaporize at 250° C. of which the moles of alkylene oxides added are from 7 to 9, the liquid 21 can be vaporized over a wide range of temperatures.

Figure 12:
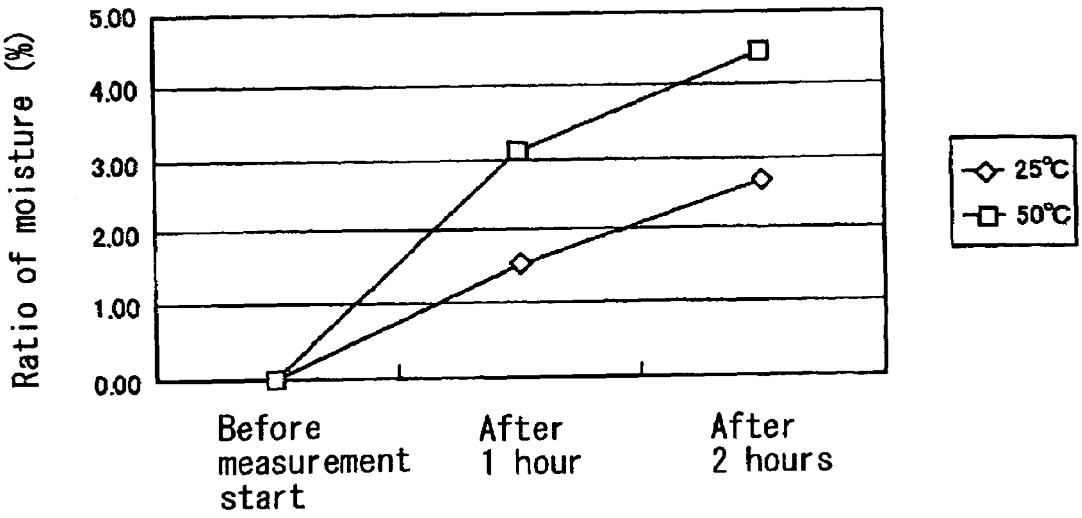
FIG. 12 represents a graph indicating a hygroscopic property of the polyethylene polypropylene glycol monomethyl ether.

In addition, the polyethylene polypropylene glycol monomethyl ether has a hygroscopic property, as illustrated in FIG. 12. FIG. 12 represents a graph illustrating changes in the amount of moisture absorbed by the polyethylene polypropylene glycol monomethyl ether left in conditions of relative humidity (RH) of 50%, with time elapse, investigated in conditions at different temperatures. Moreover, according to a measurement of a thermogravimetric analysis (TGA), the thermal decomposition temperature was 214.7° C. According to an investigation on thermal decomposition performed at a temperature of 256° C., the change of weight was 0.27%. Accordingly, because the polyethylene polypropylene glycol monomethyl ether has a hygroscopic property, and is not decomposed up to 256° C., the polyethylene polypropylene glycol monomethyl ether can be preferably utilized as the liquid 21.

Examples of a practical test for a continuous operation using a slip ring having the metal-graphite brush 1 will be explained. A cylindrical slip ring made of oxygen free copper is fastened to a rotational shaft of an induction motor utilized as a power source of the slip ring. A brush holder is provided so as to face the slip ring. A brush 1 for investigation is attached to the brush holder. Then, the induction motor was operated so as to slidably contact with the slip ring and the metal-graphite brush 1, and the amount of wear of the metal-graphite brush 1 was evaluated. In addition, the operation test was performed in following conditions; temperatures of 80° C., 120° C., 150° C., 180° C., and 220° C., the size of metal-graphite brush 1 investigated, 8 mm×5 mm×12 mm, a load applied to the slip ring from the metal-graphite brush 1, 800 gf/cm$^2$, and the rotational peripheral speed, 3.9 m/s. Under the conditions described above, the amount of wear of the metal-graphite brush 1, after being continuously operated for 100 hours in conditions of a constant temperature, was investigated.

Further, the temperature of the brush 1 operated was measured by means of a thermocouple buried in the brush 1 at a position 3 mm away from the slidable contacting surface of the brush 1. When the brush 1 was operated at an atmospheric temperature of 80° C., the temperature at a position 3 mm away from the slidable contacting surface of the brush 1 rose up to 130° C. When the brush 1 was operated at atmospheric temperatures of 120° C., 150° C., and 220° C., the temperature at a position of 3 mm away from the slidable contacting surface of the brush 1 rose up to 175° C., 180° C., and 250° C., respectively. In other words, when the brush 1 is operated, the temperature near the slidable contacting surface of the brush 1 rises by from 30° C. to 35° C. above the atmospheric temperature.

PRACTICAL EXAMPLE 1

Figure 13:
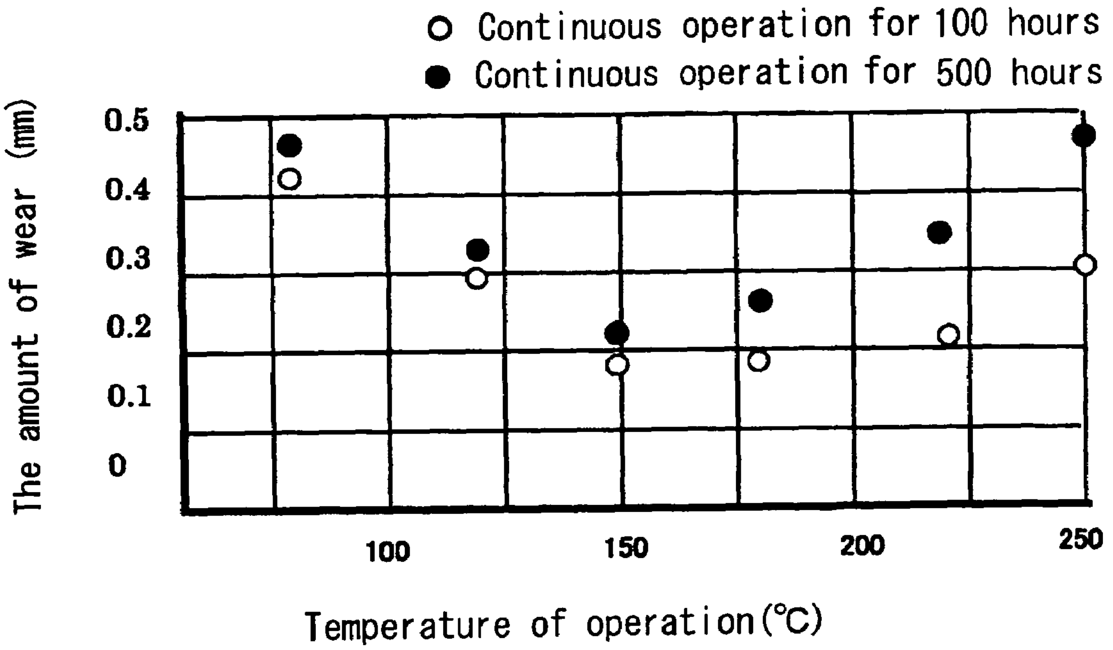
FIG. 13 represents a graph indicating a relation between the temperature at which the metal-graphite brush is operated and the degree of wear of the metal-graphite brush according to a practical example 1.

An investigation for a continuous operation of the slip ring was performed for the metal-graphite brush 1 into which the polyethylene glycol monomethyl ether, as the liquid 21, was infiltrated. According to results of the investigation, as illustrated in FIG. 13, when the temperature of the slip ring under operation was approximately within a range of from 120° C. to 200° C., the amount of wear could be restricted to a low level, but when the temperature of the slip ring under operation was greater than approximately 200° C., whenever the slip ring was continuously operated for a long period of time, the amount of wear increased. In addition, the amount of wear does not increase with increase in the temperature of the slip ring under continuous operations, within an approximate range of from 80° C. to 150° C. In other words, when the brush 1 was operated within a temperature range between 80° C. and 150° C., the amount of vapor of the polyethylene glycol monomethyl ether provided between the slidable contacting surfaces of the brush 1 and the slip ring increased commensurately with the rise in a temperature at which the brush 1 was operated, and thus the amount of wear of the brush 1 could be contained at a low level. Then, when the brush 1 was operated at a temperature greater than 180° C., the consumption rate of vapor of the polyethylene glycol monomethyl ether increased with the rise in the operation temperature of the brush 1, and a level of reduction in the amount of wear became low when the operation time of the brush 1 increased. Accordingly, when the metal-graphite brush 1 was operated within an approximate temperature range of between 120° C. and 180° C., the amount of wear of the metal-graphite brush 1, into which the polyethylene glycol monomethyl ether had been infiltrated, could be restricted to within approximately 0.3 mm. In addition, if the amount of wear of the brush 1 is restricted to approximately 0.5 mm, the brush 1 can be operated over a wide temperature range extending from 80° C. to 250° C.

PRACTICAL EXAMPLE 2

Figure 14:
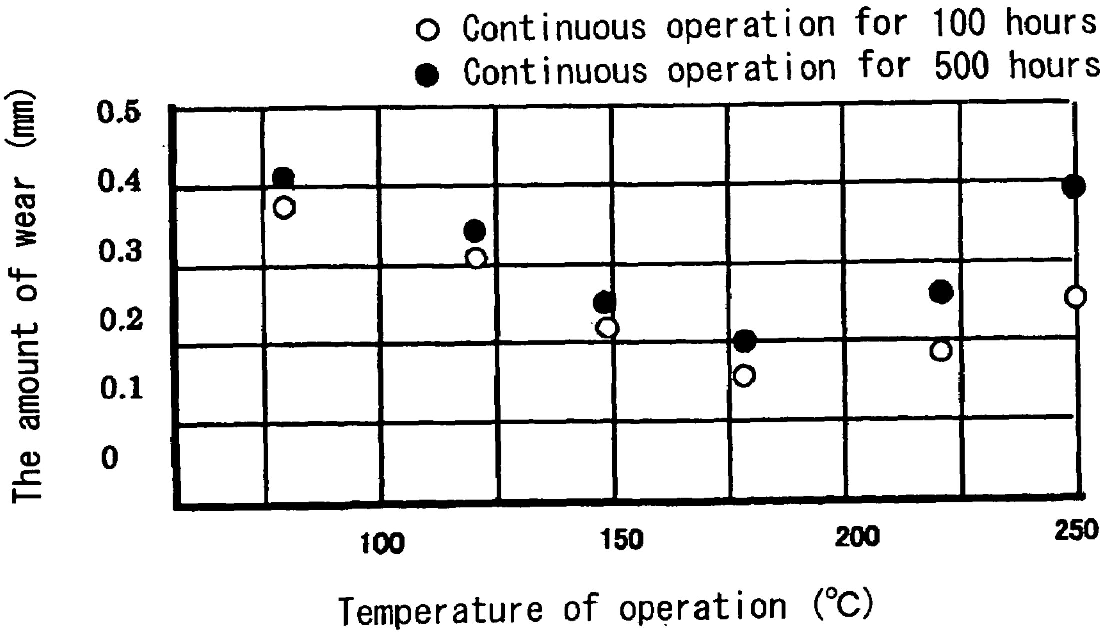
FIG. 14 represents a graph indicating a relation between the temperature at which a metal-graphite brush is operated and the degree of wear of the metal-graphite brush according to a practical example 2.

An investigation into a continuous operation of the slip ring was performed for the metal-graphite brush 1 into which the polyethylene polypropylene glycol monomethyl ether, as the liquid 21, was infiltrated. According to the results of the investigation, as illustrated in FIG. 14, when the temperature of the slip ring under operation was within an approximate range of from 120° C. to 220° C., the amount of wear could be restricted to a low level, and when the temperature of the slip ring under operation was greater than approximately 200° C., the amount of wear increased when the slip ring was continuously operated over a long period of time. In addition, under continuous operation within a range of from approximately 80° C. to 180° C., the amount of wear does not increase with the increase in temperature of the slip ring. In other words, when the brush 1 was operated within the temperature range between 80° C. and 180° C., the amount of vapor of the polyethylene polypropylene glycol monomethyl ether provided between the slidable contacting surfaces of the brush 1 and the slip ring increased commensurately with the rise in temperature at which the brush 1 was operated, and thus the amount of wear of the brush 1 could be restricted to a low level. Then, when the brush 1 was operated at a temperature greater than 220° C., the consumption rate of vapor of the polyethylene polypropylene glycol monomethyl ether increased commensurately with the rise in operation temperature of the brush 1, and the amount of wear did not drop sufficiently when the operation time of the brush 1 increased. Accordingly, the amount of wear of the metal-graphite brush 1, into which the polyethylene polypropylene glycol monomethyl ether had been infiltrated, could be restricted within approximately 0.3 mm when the metal-graphite brush 1 was operated within an approximate temperature range of between 120° C. and 220° C. In addition, if the amount of wear of the brush 1 is restricted to approximately 0.5 mm, the brush 1 can be operated over a wide temperature range between 80° C. and 250° C.

COMPARATIVE EXAMPLE

Figure 15:
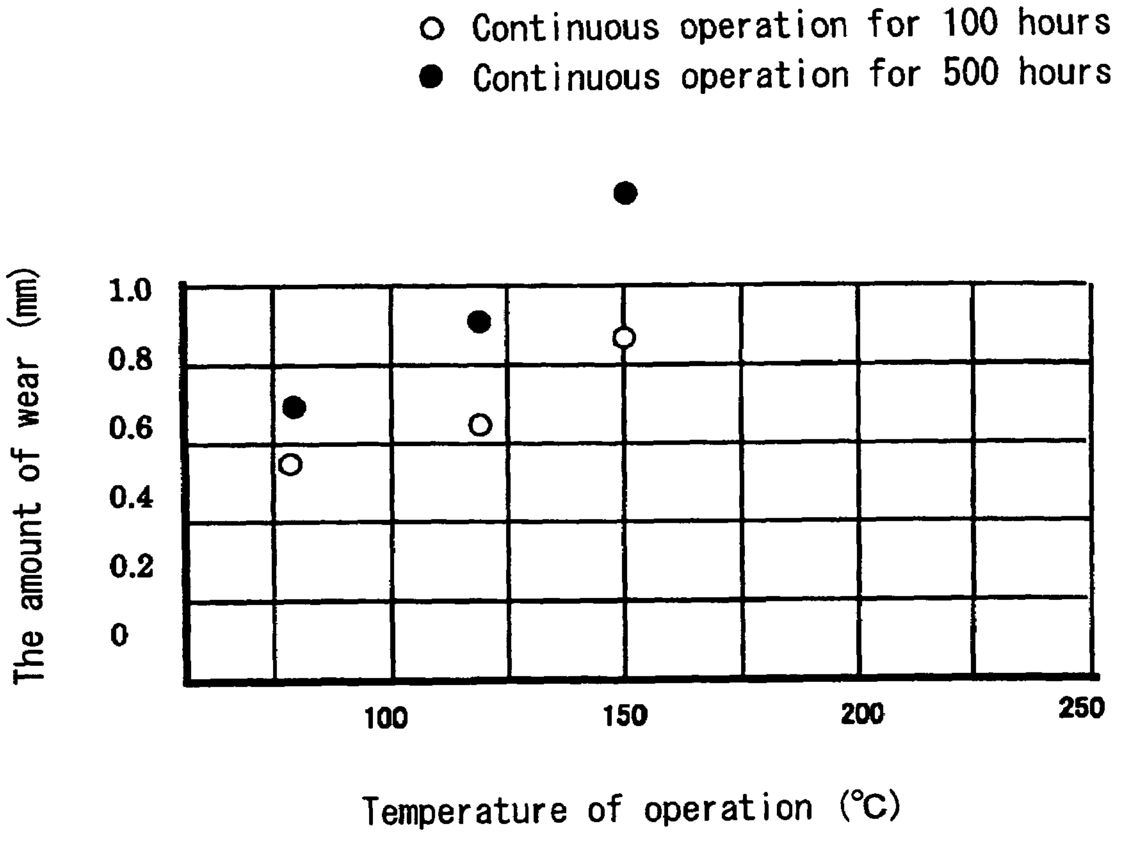
FIG. 15 represents a graph indicating a relation between the temperature at which a metal-graphite brush is operated and the degree of wear of the metal-graphite brush according to a comparative example.

As a comparative example, similar investigation for a continuous operation of a slip ring was performed for a conventional metal-graphite brush 1. According to the results of the investigation, as illustrated in FIG. 15, when the slip ring was operated at a temperature higher than 80° C., the amount of wear of the metal-graphite brush 1 increased commensurately with the increase in the operation temperature of the slip ring. Further, when the period of continuous operation time was long, the amount of wear increased significantly, commensurately with the rise in the operation temperature of the slip ring. The reason for the above is assumed to be that, as described above, the higher the operation temperature of the slip ring becomes, the shorter the period of time elapses before the moisture is depleted. For restricting the amount of wear of the brush 1 to within 0.5 mm or less, the operation temperature of the slip ring needs to be maintained at 80° C. or less, even when the slip ring is continuously operated for a shorter duration, in other words, for 100 hours.

According to an aspect of the present invention, a metal-graphite brush for supplying electricity to a coil wound around a core provided at a rotor of a motor is made of sintered material having porosities at a surface of, or inside, the sintered material. The metal-graphite brush is infiltrated by a liquid containing a plurality of kinds of glycol ether having varying numbers of alkylene oxide structure unit. The liquid has a boiling point higher than that of water.

According to the aspect of the present invention, even when the temperature of the motor utilized (in other words, temperature of the motor under operation) rises to greater than 100° C., the liquid infiltrated into the porosities of the metal-graphite brush does not completely vaporized, and vapor from the liquid does not disappear between contacting surfaces of the metal-graphite brush and the commutator. As a result, a coefficient of sliding friction between the sliding contacting surfaces of the metal-graphite brush and the commutator can be lowered, and the degree of wear of the metal-graphite brush can be lowered.

In addition, molecular weights of the glycol ether vary commensurately with the number of the alkylene oxide structure units. As a result, the vapor of the liquid described above contains plural kinds of glycol ether having varieties of properties of vapor pressure. Accordingly, the vapor of the liquid can be provided between the slidable contacting surfaces of the metal-graphite brush and the commutator over a wide range of temperatures at which the metal-graphite brush is utilized. Thus, in the metal-graphite brush according to the aspect of the present invention, the degree of wear can be reduced over a wide temperature range at which the metal-graphite brush is utilized.

According to a further aspect of the present invention, in the metal-graphite brush, an alkylene oxide structure unit includes at least one of an ethylene oxide structure unit and a propylene oxide structure unit.

According to the aspect of the present invention, sufficient vapor pressure can be obtained from these glycol ethers over a range of temperatures in which a motor is generally utilized. Therefore, when the motor is utilized, the vapor of the liquid can always be provided between the slidable contacting surfaces of the metal-graphite brush and the commutator. Thus, the degree of wear of the metal-graphite brush can be restricted to within low level.

According to a further aspect of the present invention, in the metal-graphite brush, the liquid infiltrated into the metal-graphite brush decomposes at a temperature higher than a maximum temperature of slidable contacting surfaces of the metal-graphite brush, and of a commutator for supplying electricity to the graphite-metal brush and the coil when the motor is operated.

According to the aspect of the present invention, the liquid does not decompose thermally even if the temperature of the motor under operation is high, and can be vaporized at a predetermined temperature. Therefore, vapor from the liquid can be provided between the slidable contacting surfaces of the metal-graphite brush and the commutator.

According to a further aspect of the present invention, in the metal-graphite brush, the liquid infiltrated into the metal-graphite brush contains a glycol ether that can be vaporized at a temperature lower than the temperature of slidable contacting surfaces of the metal-graphite brush, and of a commutator for supplying electricity to the graphite-metal brush and the coil when the motor is operated.

According to the aspect of the present invention, because the liquid contains glycol ethers that vaporizes at a temperature lower than the temperature of the sliding surfaces of the metal-graphite brush and the commutator, for supplying electricity to the coil, of the motor under operation, vapor from the liquid can be provided over a wide range of temperatures.

According to a further aspect of the present invention, a motor includes a housing, a magnet provided in the housing, a rotor rotatably provided in the housing so as to face the magnet, and having a coil wounded around a core of the rotor, a shaft for supporting the rotor to the housing, a commutator provided at the rotor for supplying electricity to the coil, and a metal-graphite brush that makes contact with the commutator. The metal graphite brush is made of sintered material having porosities at a surface of, and inside, the sintered material. The metal-graphite brush is infiltrated by a liquid containing a plurality of kinds of glycol ether having a varying number of alkylene oxide structure units. The liquid has a boiling point higher than that of water.

According to the aspect of the present invention, even when the temperature of the motor utilized (in other words, temperature of the motor under operation) rises to greater than 100° C., the liquid infiltrated into the porosities of the metal-graphite brush does not completely vaporized, and the vapor from the liquid does not disappear between contacting surfaces of the metal-graphite brush and the commutator. As a result, coefficient of sliding friction between the sliding contacting surfaces of the metal-graphite brush and the commutator can be lowered, and the degree of wear of the metal-graphite brush can be lowered. As a result of this, the longevity of a motor having the metal-graphite brush can be increased.

In addition, molecular weights of the glycol ether vary commensurately with the numbers of the alkylene oxide structure units. As a result, vapor of the liquid described above contains plural kinds of glycol ether having varieties of properties of vapor pressure. Accordingly, vapor of the liquid can be provided between the slidable contacting surfaces of the metal-graphite brush and the commutator over a wide range of temperatures. Thus, in the metal-graphite brush according to the aspect of the present invention, because the degree of wear can be lowered over a wide temperature range at which the metal-graphite brush is utilized, the longevity of a motor having the metal-graphite brush can be increased.

A motor having a metal-graphite brush according to an aspect of the present invention can be applied for a vehicle use, such as a motor for actuating a water pump for purposes of cooling an engine of a vehicle, a motor for actuating a cooling fan, and a motor for actuating an oil pump of an engine. However, the present invention is not limited, and can be applied for versatile applications.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A metal-graphite brush for supplying electricity to a coil wound around a core provided at a rotor of a motor, wherein the metal-graphite brush is made of sintered material having porosities at a surface of, or inside, the sintered material, the metal-graphite brush is infiltrated by a liquid containing a plurality of kinds of glycol ether having varying numbers of alkylene oxide structure units, the liquid having a boiling point higher than that of water, and wherein a glycol ether, selected from the plurality of kinds of glycol ether according to a temperature of a slidable contacting surface of the metal-graphite brush with a commutator for supplying electricity to the coil, is selectively vaporized, transferred toward the slidable contacting surface and supplied between the slidable contacting surface of the metal-graphite brush and the commutator.

2. The metal-graphite brush according to claim 1, wherein an alkylene oxide structure unit includes at least one of an ethylene oxide structure unit and a propylene oxide structure unit.

3. The metal-graphite brush according to claim 2, wherein the liquid infiltrated into the metal-graphite brush contains a glycol ether that can be vaporized at a temperature lower than a temperature of slidable contacting surfaces of the metal-graphite brush, and of a commutator for supplying electricity to the graphite-metal brush and the coil when the motor is operated.

4. The metal-graphite brush according to claim 2, wherein the liquid infiltrated into the metal-graphite brush decomposes at a temperature higher than a maximum temperature of slidable contacting surfaces of the metal-graphite brush, and of a commutator for supplying electricity to the graphite-metal brush and the coil when the motor is operated.

5. The metal-graphite brush according to claim 4, wherein the liquid infiltrated into the metal-graphite brush contains a glycol ether that can be vaporized at a temperature lower than a temperature of the slidable contacting surfaces of the metal-graphite brush, and of the commutator when the motor is operated.

6. The metal-graphite brush according to claim 1, wherein the liquid infiltrated into the metal-graphite brush decomposes at a temperature higher than a maximum temperature of slidable contacting surfaces of the metal-graphite brush, and of a commutator for supplying electricity to the graphite-metal brush and the coil when the motor is operated.

7. The metal-graphite brush according to claim 6, wherein the liquid infiltrated into the metal-graphite brush contains a glycol ether that can be vaporized at a temperature lower than a temperature of the slidable contacting surfaces of the metal-graphite brush, and of the commutator when the motor is operated.

8. The metal-graphite brush according to claim 1, wherein the liquid infiltrated into the metal-graphite brush contains a glycol ether that can be vaporized at a temperature lower than the temperature of slidable contacting surfaces of the metal-graphite brush, and of a commutator for supplying electricity to the graphite-metal brush and the coil when the motor is operated.

9. The metal-graphite brush according to claim 1, wherein the metal-graphite brush is made of sintered material on the basis of natural graphite particles.

10. The metal-graphite brush according to claim 1, wherein the glycol ether infiltrated into the metal-graphite brush is a mixture containing ethylene glycol monomethyl ether, diethylene glycol monomethyl ether, triethylene glycol monomethyl ether, tetraethylene glycol monomethyl ether, pentaethylene glycol monomethyl ether, and hexaethylene glycol monomethyl ether.

11. The metal-graphite brush according to claim 1, wherein the glycol ether infiltrated into the metal-graphite brush is a mixture containing propylene glycol monomethyl ether, dipropylene glycol monomethyl ether, tripropylene glycol monomethyl ether, tetrapropylene glycol monomethyl ether, pentapropylene glycol monomethyl ether, hexapropylene glycol monomethyl ether, heptapropylene glycol monomethyl ether, octapropylene glycol monomethyl ether, and nonapropylene glycol monomethyl ether.

12. The metal-graphite brush according to claim 1, wherein the glycol ether is synthesized by a reaction of additional polymerization in which ethylene oxide and propylene oxide are randomly added to methanol.

13. The metal-graphite brush according to claim 1, wherein at least two of the plurality of kinds of glycol ether vaporize at different operating temperatures so as to be respectively transferred toward the slidable contacting at the different operating temperatures.

14. A metal-graphite brush for supplying electricity for a coil wound around a core provided at a rotor of a motor, wherein the metal-graphite brush is made of sintered material having porosities at a surface of, and inside, the sintered material, the metal-graphite brush is infiltrated by a liquid containing a plurality of kinds of glycol ether having varying vaporization properties, the liquid having a boiling point higher than water, and wherein a glycol ether, selected from the plurality of kinds of glycol ether according to a temperature of a slidable contacting surface of the metal-graphite brush with a commutator for supplying electricity to the coil, is selectively vaporized, transferred toward the slidable contacting surface and supplied between the slidable contacting surface of the metal-graphite brush and the commutator.

15. The metal-graphite brush according to claim 14, wherein the liquid infiltrated into the metal-graphite brush decomposes at a temperature higher than a maximum temperature of slidable contacting surfaces of the metal-graphite brush, and of a commutator for supplying electricity to the graphite-metal brush and the coil when the motor is operated.

16. The metal-graphite brush according to claim 14, wherein the liquid infiltrated into the metal-graphite brush contains a glycol ether that can be vaporized at a temperature lower than a temperature of slidable contacting surfaces of the metal-graphite brush, and of a commutator for supplying electricity to the metal-graphite brush and the coil when the motor is operated.

17. The metal-graphite brush according to claim 14, wherein at least two of the plurality of kinds of glycol ether vaporize at different operating temperatures so as to be respectively transferred toward the slidable contacting at the different operating temperatures.

18. A motor comprising:

a housing;

a magnet provided in the housing;

a rotor rotatably provided in the housing so as to face the magnet, and having a coil wounded around a core of the rotor;

a shaft for supporting the rotor to the housing;

a commutator provided at the rotor for supplying electricity to the coil; and a metal-graphite brush that makes contact with the commutator, wherein the metal graphite brush is made of sintered material having porosities at a surface of, and inside, the sintered material, the metal-graphite brush is infiltrated by a liquid containing a plurality of kinds of glycol ether having varying numbers of alkylene oxide structure units, the liquid having a boiling point higher than that of water, and wherein a glycol ether, selected from the plurality of kinds of glycol ether according to a temperature of a slidable contacting surface of the metal-graphite brush with a commutator for supplying electricity to the coil, is selectively vaporized, transferred toward the slidable contacting surface and supplied between the slidable contacting surface of the metal-graphite brush and the commutator.

19. The motor according to claim 18, wherein an average molecular weight of the plurality of kinds of glycol ether is 220 or less.

20. The motor according to claim 18, wherein the liquid has water-solubility and a hygroscopic property.

21. The motor according to claim 18, wherein at least two of the plurality of kinds of glycol ether vaporize at different operating temperatures so as to be respectively transferred toward the slidable contacting at the different operating temperatures.

* * * * *